(12) United States Patent
Prevost

(10) Patent No.: US 11,835,078 B2
(45) Date of Patent: Dec. 5, 2023

(54) THREADED POSITIONING MECHANISM

(71) Applicant: XR Reserve LLC, Houston, TX (US)

(72) Inventor: Gregory Prevost, Spring, TX (US)

(73) Assignee: XR Reserve LLC, Houston, TX (US)

( * ) Notice: Subject to any disclaimer, the term of this patent is extended or adjusted under 35 U.S.C. 154(b) by 676 days.

(21) Appl. No.: 16/870,596

(22) Filed: May 8, 2020

(65) Prior Publication Data

US 2020/0355213 A1    Nov. 12, 2020

Related U.S. Application Data

(60) Provisional application No. 62/845,131, filed on May 8, 2019.

(51) Int. Cl.
*F16B 35/04*    (2006.01)
*F16B 33/02*    (2006.01)
*F16B 39/02*    (2006.01)

(52) U.S. Cl.
CPC ............ *F16B 33/02* (2013.01); *F16B 39/023* (2013.01)

(58) Field of Classification Search
CPC .............................. F16B 39/023; F16B 33/02
(Continued)

(56) References Cited

U.S. PATENT DOCUMENTS 1,798,604 A    3/1931    Hoke
2,075,467 A *  3/1937    Quesada .................. F01L 1/14
411/930

(Continued)

FOREIGN PATENT DOCUMENTS

WO    2006028327 A1    3/2006
WO    2014014673 A1    1/2014
(Continued)

OTHER PUBLICATIONS

International Search Report and Written Opinion dated Aug. 3, 2020 (issued in PCT Application No. PCT/US20/21549) [11 pages].
International Search Report and Written Opinion dated Sep. 9, 2020 (issued in PCT Application No. PCT/US20/32196) [13 pages].
(Continued)

*Primary Examiner* — Gary W Estremsky
(74) *Attorney, Agent, or Firm* — Michael S. McCoy; Amatong McCoy LLC

(57) ABSTRACT

A threaded installation is provided. The threaded installation includes a nut, a bolt, and a housing. The housing includes a threaded hole. A first threaded connection is formed where the bolt is threadably coupled with the nut, and a second threaded connection is formed where the bolt is threadably coupled with the threaded hole. The first threaded connection is characterized by a first flank angle, $\Theta_{2A}$, of threads of the bolt or threads of the nut. The second threaded connection is characterized by a second flank angle, $\Theta_{3B}$, of threads of the bolt or threads of the housing. The flank angles, $\Theta_{2A}$ and $\Theta_{3B}$, satisfy the following equation:

$$k_2 = \frac{\cos(\theta_{2A})}{\cos(\theta_{3B})} > 1.00.$$

27 Claims, 7 Drawing Sheets

(58) Field of Classification Search
USPC .............. 411/222, 308, 307, 310, 263, 168
See application file for complete search history.

(56) References Cited

U.S. PATENT DOCUMENTS

| | | | | |
|---|---|---|---|---|
| 2,294,054 | A * | 8/1942 | Thompson | F16B 37/02 |
| | | | | 411/929 |
| 2,407,586 | A * | 9/1946 | Summers | F16B 31/04 |
| | | | | 411/107 |
| 3,601,830 | A * | 8/1971 | Stover | F16B 39/284 |
| | | | | 470/11 |
| 3,707,107 | A * | 12/1972 | Bieri | F16B 33/02 |
| | | | | 411/423 |
| 4,171,012 | A | 10/1979 | Holmes | |
| 4,275,935 | A | 6/1981 | Thompson et al. | |
| 4,364,136 | A | 12/1982 | Hattan | |
| 4,432,682 | A | 2/1984 | McKewan | |
| 4,802,805 | A * | 2/1989 | Hattan | F16B 39/38 |
| | | | | 411/432 |
| 4,848,953 | A * | 7/1989 | Young | F16B 7/14 |
| | | | | 403/374.4 |
| 5,123,772 | A * | 6/1992 | Anderson | F16D 1/096 |
| | | | | 403/368 |
| 5,154,560 | A * | 10/1992 | Copito | F16B 39/12 |
| | | | | 411/266 |
| 5,176,483 | A | 1/1993 | Baumann et al. | |
| 5,514,183 | A | 5/1996 | Epstein et al. | |
| 6,517,583 | B1 | 2/2003 | Pope et al. | |
| 7,922,432 | B2 * | 4/2011 | Chiu | F16B 5/0208 |
| | | | | 411/107 |
| 8,080,071 | B1 | 12/2011 | Vail | |
| 8,911,521 | B1 | 12/2014 | Miess et al. | |
| 9,410,573 | B1 | 8/2016 | Lu | |
| 9,568,037 | B2 * | 2/2017 | Staniszewski | F16B 33/006 |
| 9,732,791 | B1 | 8/2017 | Gonzalez | |
| 10,465,775 | B1 | 11/2019 | Miess et al. | |
| 2003/0220691 | A1 | 11/2003 | Songer et al. | |
| 2012/0225253 | A1 | 9/2012 | DiGiovanni et al. | |
| 2012/0281938 | A1 | 11/2012 | Peterson et al. | |
| 2013/0315665 | A1 * | 11/2013 | Heston | F16D 1/094 |
| | | | | 403/374.4 |
| 2015/0027713 | A1 | 1/2015 | Penisson | |
| 2016/0348709 | A1 | 12/2016 | Staniszewski | |
| 2017/0030393 | A1 * | 2/2017 | Phua | F16B 39/30 |
| 2020/0031586 | A1 | 1/2020 | Miess et al. | |
| 2020/0032841 | A1 | 1/2020 | Miess et al. | |
| 2020/0032846 | A1 | 1/2020 | Miess et al. | |
| 2020/0056659 | A1 | 2/2020 | Prevost et al. | |
| 2020/0063498 | A1 | 2/2020 | Prevost et al. | |
| 2020/0063503 | A1 | 2/2020 | Reese et al. | |
| 2020/0182290 | A1 | 6/2020 | Doehring et al. | |

FOREIGN PATENT DOCUMENTS

| | | |
|---|---|---|
| WO | 2018041578 A1 | 3/2018 |
| WO | 2006011028 A1 | 2/2020 |

OTHER PUBLICATIONS https://www.stanleyengineeredfastening.com/brands/optia/spiralock, Spriralock, Accessed on Aug. 3, 2020, 8 Pages.
International Preliminary Report on Patentability issued in PCT Application No. PCT/US2020/032196; dated Nov. 18, 2021 [12 pages].
Extended European Search Report received in EP Application No. 20801522.2 (dated May 26, 2023) [5 pages].

* cited by examiner

THREADED POSITIONING MECHANISM

CROSS-REFERENCE TO RELATED PATENT APPLICATIONS

The present application claims the benefit of U.S. Provisional Patent Application No. 62/845,131, filed on May 8, 2019, entitled "Threaded Positioning Mechanism", the entirety of which is incorporated herein by reference.

FIELD

The present disclosure relates to threaded positioning mechanisms, apparatus and systems including the same, and methods of making and using the same.

BACKGROUND

Many components have threaded connections, such as a screw threaded to a component (e.g., a screw or bolt threaded to a housing of the component). A bolt may be secured to the component by a nut. When the nut is tightened onto the bolt, there may be a differential in the torsional friction at the threaded connection between the bolt and the component relative to the torsional friction at the threaded connection between the nut and the bolt. Such torsional friction differentials may cause the bolt to, undesirably, turn with the nut while the nut is being turned in an attempt to tighten the nut onto the bolt. Such undesired turning of the bolt can result in an at least temporary axial displacement of the bolt.

Some attempts to address these issues have included externally securing the bolt (e.g., with a wrench) while tightening the nut. Examples include SPIRALOCK® threads which are configured to prevent loosening of bolts due to vibrations. However, thread shapes have not been designed to address the specific issue of limiting bolt movement while tightening a nut.

BRIEF SUMMARY

Some embodiments of the present disclosure include a threaded installation. The threaded installation includes a nut, a bolt, and a housing. The housing includes a threaded hole. A first threaded connection is formed where the bolt is threadably coupled with the nut. A second threaded connection is formed where the bolt is threadably coupled with the threaded hole. The first threaded connection is characterized by a first flank angle, $\Theta_{2A}$, of threads of the bolt or threads of the nut. The second threaded connection is characterized by a second flank angle, $\Theta_{3B}$, of threads of the bolt or threads of the housing. The flank angles, $\Theta_{2A}$ and $\Theta_{3B}$, satisfy the following equation:

$$k_2 = \frac{\cos(\theta_{2A})}{\cos(\theta_{3B})} > 1.00.$$

Some embodiments of the present disclosure include a system. The system includes a housing having a threaded hole, a nut, and a bolt having an engagement surface thereon or coupled therewith. A first threaded connection is formed where the bolt is threadably coupled with the nut. A second threaded connection is formed where the bolt is threadably coupled with the threaded hole. The system includes an opposing housing having an opposing engagement surface. The opposing housing is positioned relative to the bolt such that the engagement surface engages with or is spaced-apart from the opposing engagement surface. The first threaded connection is characterized by a first flank angle, $\Theta_{2A}$, of threads of the bolt or threads of the nut. The second threaded connection is characterized by a second flank angle, $\Theta_{3B}$, of threads of the bolt or threads of the housing. The flank angles, $\Theta_{2A}$ and $\Theta_{3B}$, satisfy the following equation:

$$k_2 = \frac{\cos(\theta_{2A})}{\cos(\theta_{3B})} > 1.00.$$

For example, and without limitation, the housing may be a stator and the opposing housing may be a rotor.

Some embodiments of the present disclosure include a method of maintaining a position of a bolt within a threaded installation. The method includes threadably coupling a bolt with a threaded hole of a housing. The method includes threadably coupling a nut with the bolt, forming a threaded installation. The threaded connection between the nut and the bolt is characterized by a first flank angle, $\Theta_{2A}$, of threads of the bolt or threads of the nut. The threaded connection between the bolt and the housing is characterized by a second flank angle, $\Theta_{3B}$, of threads of the bolt or threads of the housing. The flank angles, $\Theta_{2A}$ and $\Theta_{3B}$, satisfy the following equation:

$$k_2 = \frac{\cos(\theta_{2A})}{\cos(\theta_{3B})} > 1.00.$$

Some embodiments of the present disclosure include a threaded installation. The threaded installation includes a nut, a bolt, and a housing, the housing including a threaded hole. A first threaded connection is formed where the bolt is threadably coupled with the nut, and a second threaded connection is formed where the bolt is threadably coupled with the threaded hole. The bolt has asymmetric threading, including a first flank having a first flank angle and a second flank having a second flank angle. The first flank angle is smaller than the second flank angle. The second flank carries bearing load on the bolt, and the first flank carries positioning load on the bolt. As used herein, "positioning load" refers to load on the bolt from the action of coupling of the bolt, nut, and housing together. As used herein, "bearing load" refers to other loads on the bolt during use of the threaded installation that are not "positioning loads," including load from intended use of the threaded installation.

Some embodiments of the present disclosure include a system that includes a housing, the housing having a threaded hole. The system includes a nut and a bolt, the bolt having an engagement surface thereon or coupled therewith. A first threaded connection is formed where the bolt is threadably coupled with the nut, and a second threaded connection is formed where the bolt is threadably coupled with the threaded hole. An opposing housing having an opposing engagement surface is positioned relative to the bolt such that the engagement surface engages with or is spaced-apart from the opposing engagement surface. The bolt has asymmetric threading, including a first flank having a first flank angle and a second flank having a second flank angle, where the first flank angle is smaller than the second flank angle. The second flank carries bearing load on the bolt, and the first flank carries positioning load on the bolt.

Some embodiments of the present disclosure include a method of maintaining a position of a bolt within a threaded installation. The method includes threadably coupling a bolt with a threaded hole of a housing, and threadably coupling a nut with the bolt, forming a threaded installation. The bolt has asymmetric threading, including a first flank having a first flank angle and a second flank having a second flank angle, where the first flank angle is smaller than the second flank angle. The method includes carrying bearing load on the bolt on the second flank, and carrying positioning load on the bolt on the first flank.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Figure 1A:
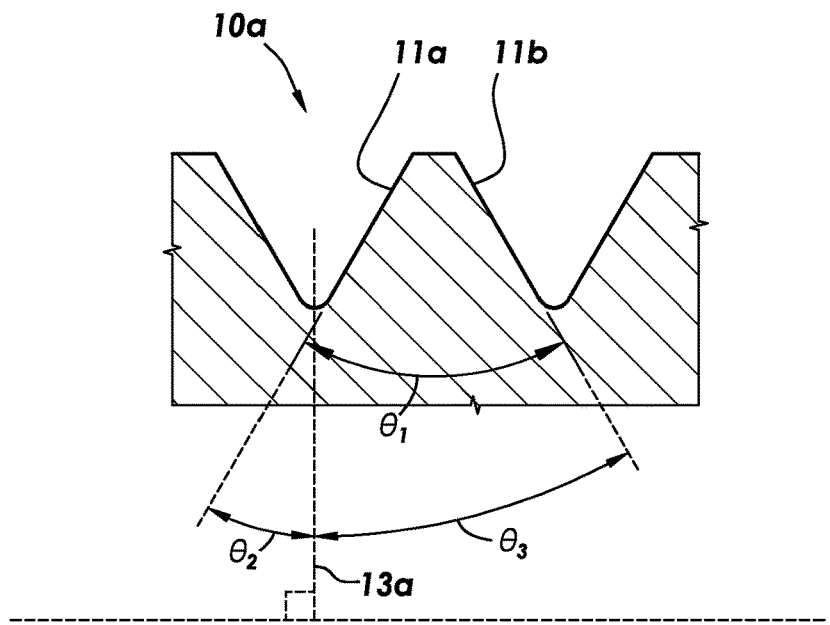
FIG. 1A is a detail view of a symmetrical thread, showing thread angle and flank angles thereof.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include threaded positioning mechanisms, apparatus and systems including the same, and methods of making and using the same.

Threaded Installations

Embodiments of the present disclosure include threaded installations that include a bolt threadably coupled with both a component (e.g., a housing, such as a bearing housing) and a nut. For example, the bolt may be threadably coupled with the component at one end of the bolt, and threadably coupled with the nut at the other end of the bolt. Applicants have found that such threaded installations can be configured such that the differential in torsional friction at the threaded connection between the bolt and the component relative to the torsional friction at the threaded connection between the nut and the bolt can be controlled such that, with the bolt threadably coupled to the component: (1) rotation of the bolt can be reduced while threadably coupling the nut onto the bolt; and (2) axial displacement of the bolt relative to the component can be reduced while threadably coupling the nut onto the bolt. In such threaded installations, the nut can be threadably coupled onto the bolt without requiring any external securement of the bolt (e.g., without securing the bolt with a wrench). While the threaded installation disclosed herein is described as including a bolt and a nut, one skilled in the art would understand that the present disclosure is not limited to bolts and nuts, and may include other threadably coupled components. In some embodiments, the bolt includes symmetric threads. In other embodiments, the bolt includes asymmetric threads. The bolt can include SPIRALOCK® threads, buttress threads, Standard threads, or another thread form. Throughout the present disclosure, "SPIRALOCK® threads" is in reference to the locking thread construction described in U.S. Pat. No. 4,171,012. One skilled in the art would understand what is meant by "SPIRALOCK® threads," so the details of such threads will not be provided in great detail herein. Rather, the entirety of U.S. Pat. No. 4,171,012 is incorporated herein by reference and made a part of the present disclosure, and serves as a description of "SPIRALOCK® threads," as used by the Applicants. Briefly, however, SPIRALOCK® threads are a locking thread form, which may be threaded to Standard threads, and has a flat area or wedge ramp at the thread root (e.g., see FIGS. 5A and 5B).

Figure 1B:
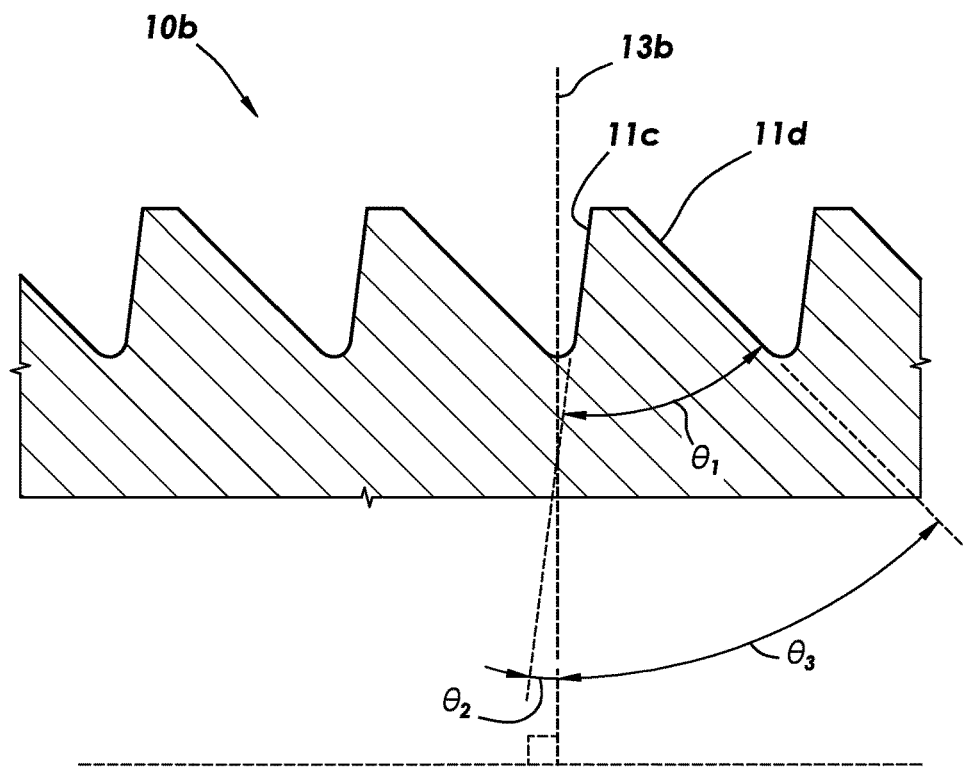
FIG. 1B is a detail view of an asymmetrical thread, showing flank angles thereof.

FIG. 1A depicts an exemplary symmetric, standard thread form, thread 10a, with the thread angle, $\Theta_1$, also referred to as an included angle, indicated. Also indicated in FIG. 1A are the flank angles $\Theta_2$ and $\Theta_3$ of flanks 11a and 11b, respectively, as measured relative to line 13a, with $\Theta_2$ and $\Theta_3$ being equal. As would be understood by one skilled in the art, flank angles are angles measured from an axis perpendicular to the thread axis to the thread flank. FIG. 1B depicts an exemplary asymmetric, buttress thread form, thread 10b, with thread angle $\Theta_1$ and flank angles $\Theta_2$ and $\Theta_3$ of flanks 11c and 11d, respectively, as measured relative to line 13b, being indicated. In FIG. 1B, $\Theta_3$ is larger than $\Theta_2$. For example, in FIG. 1B, the buttress thread forms may have a 7° flank and a 45° flank, and be designed to take load on the 7° flank, flank 11c, and to not take load on the 45° flank, flank 11d.

Asymmetric threads are intended and designed to bear load in one direction, and not to in the other direction. For example, asymmetric threads are intended and designed to bear load on one flank (the "load bearing flank") and not to bear load on the other flank (the "non-load bearing flank"). With reference to the buttress thread form of FIG. 1B, buttress thread 10b is intended and designed to bear load on the 7° flank, 11c. However, the 45° flank of buttress thread 10b is not intended or designed to bear load. As used herein, the "load bearing flank" or "loaded flank" refers to the flank of a thread form that is intended and designed to bear load.

As used herein, the "non-load bearing flank" or "unloaded flank" refers to the flank of a thread form that is not intended or designed to bear load. Applicants have, surprisingly and unexpectedly, found that, within the threaded installations described herein, threads can bear load on both flanks, such that both load bearing flank and non-load bearing flanks bear load within the threaded installation. Applicants have further identified equations (Equations 1 and 2, set forth herein) with regards to the geometry of the one or more thread forms of the bolt, the satisfaction of which provides a reduction in rotational and axial displacement of the bolt during tightening of the nut onto the bolt. Without being bound by theory, Applicants have determined that, for symmetric thread forms, if the following ratio, $k_1$, is satisfied:

$$k_1 = \frac{\cos\left(\frac{\theta_{1A}}{2}\right)}{\cos\left(\frac{\theta_{1B}}{2}\right)} > 1.00 \qquad \text{Equation 1}$$

then rotation of the bolt will be reduced when the nut is tightened onto the bolt (e.g., the degree to which the bolt turns with the nut when the nut is tightened onto the bolt will be reduced relative to when Equation 1 is not satisfied). In Equation 1, $\Theta_{1A}$ is the thread angle (included angle) of the bolt threads at the threaded connection between the bolt and the nut, and $\Theta_{1B}$ is the thread angle (included angle) of the bolt threads at the threaded connection between the bolt and the component. Equation 1 is valid for symmetric thread forms, and not valid for asymmetrical thread forms. While $k_1$ is optimally equal to or greater than 1.1, in some embodiments, a $k_1$ greater than 1.00 still provides the benefits of reduced rotational and axial displacement of the bolt. For example, in some embodiments, bolts having symmetric thread forms have a $k_1$ value that is: greater than 1.00, equal to or greater than 1.05, equal to or greater than 1.1, equal to or greater than 1.2, equal to or greater than 1.35, or equal to or greater than 1.5. In some embodiments, bolts having symmetric thread forms have a $k_1$ value that ranges from 1.05 to 11, or from 1.05 to 7, or from 1.1 to 2, or from 1.2 to 5, or from 1.35 to 3, or from 1.5 to 2, including any discrete value within or between these ranges. The higher the $k_1$ value, the less likely it is that the bolt will become axially and/or rotationally displaced in response to the threading of the nut onto the bolt.

In addition to Equation 1, Applicants have determined that, for symmetric or asymmetric thread forms, if the following ratio, $k_2$, is satisfied:

$$k_2 = \frac{\cos(\theta_{2A})}{\cos(\theta_{3B})} > 1.00 \qquad \text{Equation 2}$$

then rotation of the bolt will be reduced when the nut is tightened onto the bolt (e.g., the degree to which the bolt turns with the nut when the nut is tightened onto the bolt will be reduced relative to when Equation 2 is not satisfied). In Equation 2, $\Theta_{2A}$ is the flank angle of the flank of the threads at the threaded connection between the bolt and the nut, and $\Theta_{3B}$ is the flank angle of the flank of the threads at the threaded connection between the bolt and the component. Equation 2 is valid for both symmetric and asymmetric thread forms. While $k_2$ is optimally equal to or greater than 1.1, in some embodiments, a $k_2$ greater than 1.00 provides the benefits of reduced rotational and axial displacement of the bolt. For example, in some embodiments, bolts (symmetric or asymmetric) have a $k_2$ value that is: greater than 1.00, equal to or greater than 1.05, equal to or greater than 1.1, equal to or greater than 1.2, equal to or greater than 1.35, or equal to or greater than 1.5. In some embodiments, bolts (symmetric or asymmetric) have a $k_2$ value that ranges from 1.05 to 11, or from 1.05 to 7, or from 1.1 to 2, or from 1.2 to 5, or from 1.35 to 3, or from 1.5 to 2, including any discrete value within or between these ranges. In some embodiments, $\Theta_{2A}$ ranges from 0° to 30°, or from 5° to 25°, or from 10° to 20°, or from 12° to 18°. In some embodiments, $\Theta_{3B}$ ranges from 30° to 80°, or from 35° to 75°, or from 40° to 70°, or from 45° to 65°, or from 50° to 60°.

In Equations 1 and 2, it is assumed that the coefficient of friction between the bolt and the component, and the coefficient of friction between the bolt and the nut are equal. However, one skilled in the art would understand that variables, such as variations in the materials of the bolt, nut, and component; variations in the flank angles at the threaded connection between the bolt and the component and at the threaded connection between the bolt and the nut; and the presence or absence of lubricants at the threaded connection between the bolt and the component and at the threaded connection between the bolt and the nut can affect the coefficient of friction between the bolt, nut, and component. In some embodiments, the present disclosure includes threaded installations in which the ratio of the torsional friction at the connection between the bolt and the component to the torsional friction at the connection between the bolt and the nut is greater than 1. That is, the torsional friction at the connection between the bolt and the component is greater than the torsional friction at the connection between the bolt and the nut. With such a ratio of torsional friction between the threaded connections of the bolt to the component and the nut, the axial and rotational position of the bolt can be substantially maintained during the threading of the nut to the bolt, because a force required to overcome the torsional friction at the threaded connection of the bolt and the nut to attach the nut to the bolt can be applied that is insufficient to overcome the torsional friction at the threaded connection of the bolt and the component. In some embodiments, such a ratio of torsional friction between the threaded connections of the bolt to the component and the nut can be attained by having a bolt with two different thread forms, including one thread form at the threaded connection of the bolt with the nut, and another, different, thread form at the threaded connection of the bolt with the component. In embodiments with different thread forms, the different thread forms may be symmetrical thread forms or asymmetrical thread forms. In other embodiments, such a ratio of torsional friction between the threaded connections of the bolt to the component and the nut can be attained by having a bolt with an asymmetrical thread form such that one flank of the bolt threads, having one flank angle, engages with the threads of the nut, and the other, different, flank of the bolt threads, having another different flank angle, engages with the threads of the component. As would be understood by one skilled in the art, the "thread form" is the configuration of the thread in an axial plane, that is, the profile of the thread including the crest, root, and flanks of the thread.

Threaded Installation—Different Thread Forms

Figure 2:
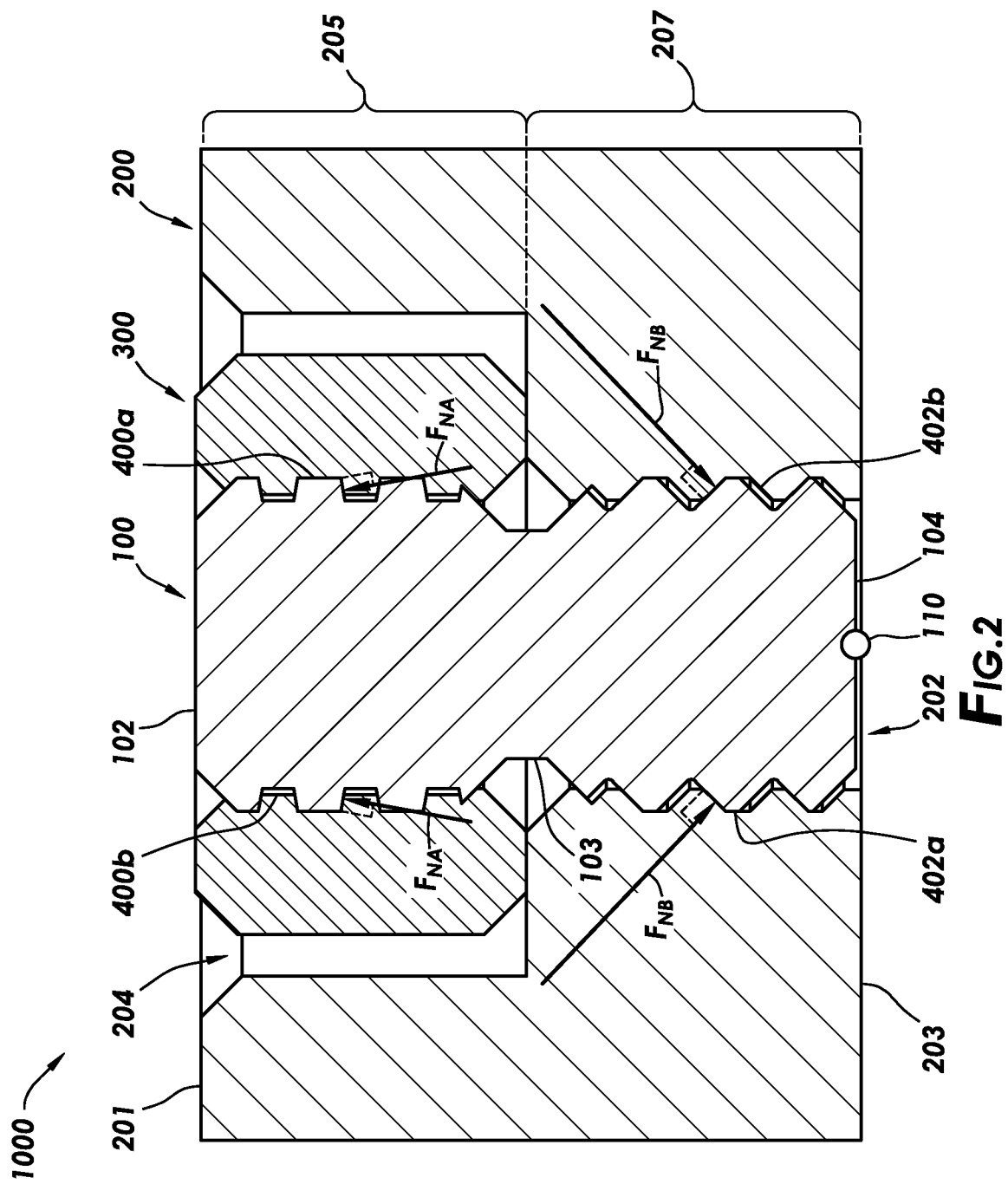
FIG. 2 is a threaded installation having two different thread forms.

FIG. 2 depicts an embodiment of a threaded installation that includes a bolt having two different thread forms, including one thread form at the threaded connection of the bolt with the nut, and another, different, thread form at the threaded connection of the bolt with the component. With reference to FIG. 2, threaded installation 1000 includes bolt 100. Bolt 100 has first longitudinal end 102 and second longitudinal end 104, with second longitudinal end 104 opposite first longitudinal end 102. Bolt 100 has lateral surface 103 between first longitudinal end 102 and second longitudinal end 104. Bolt 100 includes first threads 400a formed on the lateral surface 103 proximate first end 102. Bolt 100 includes second threads 402a formed on the lateral surface 103 proximate second end 104.

Threaded installation 1000 includes housing 200. Housing 200 includes cavity 204 at first end 201 of housing 200. Cavity 204 extends from first end 201 of housing 200 and into housing 200 by distance 205. Housing 200 includes threaded hole 202 at second end 203 of housing 200. Threaded hole 202 extends from second end 203 of housing 200 and into housing 200 by distance 207 such that threaded hole 202 is contiguous with cavity 204. Threaded hole 202 has threads 402b formed on a surface thereof. While housing 200 is shown as having recessed cavity 204 in which nut 300 is positioned, the threaded installations disclosed herein are not limited such a configuration, and some embodiments of the housing do not include a recessed cavity.

Threaded installation 1000 includes nut 300. Nut 300 includes threads 400b on an internal surface thereof. In some embodiments, each of bolt 100, housing 200, and nut 300 include the same material. For example, each of bolt 100, housing 200, and nut 300 may be stainless steel. In other embodiments, at least two of bolt 100, housing 200, and nut 300 include different materials.

At first end 102, bolt 100 is threadably coupled with nut 300 via the mating of first threads 400a with threads 400b on nut 300, forming first mated threads (i.e., first threaded connection). At second longitudinal end 104, bolt 100 is threadably coupled with housing 200 via the mating of second threads 402a with threads 402b of threaded hole 202, forming second mated threads (i.e., second threaded connection). In the embodiment of FIG. 2, the length of the first mated threads is depicted as being approximately the same as same length as the second mated threads. One skilled in the art would appreciate, however, that the two lengths can be different.

In some embodiments, to assemble threaded installation 1000, bolt 100 is threadably coupled with housing 200 via inserting bolt 100 into cavity 204 and then into threaded hole 202 by mating of threads 402a and 402b. With bolt 100 threadably mated with housing 200, nut 300 is threadably coupled with bolt 100 via threadably mating threads 400a and 400b, such that nut 300 is positioned, at least partially, within cavity 204.

First mated threads 400a and 400b are of a different thread form than second mated threads 402a and 402b. When the first mated threads 400a and 400b are more efficient than the second mated threads 402a and 402b; that is, when the thread angle of the first mated threads 400a and 400b, $\theta_A$, is lower than the thread angle of second mated threads 402a and 402b, $\theta_B$, then, during tightening of the nut 300 onto the bolt 100 via the mating of threads 400a and 400b, the torsional friction of the second mated threads 402a and 402b is higher than the torsional friction of the first mated threads 400a and 400b, such that the rotational and axial position of bolt 100 relative to housing 200 is maintained. That is, when Equation 1 is satisfied with $\Theta_{1A}$ set as the thread angle of the first mated threads 400a and 400b and $\Theta_{1B}$ set as the thread angle of the second mated threads 402a and 402b, then axial and rotational displacement of bolt 100 relative to housing 200 is reduced during the threading of nut 300 onto bolt 100 in comparison to an otherwise identical threaded installation where Equation 1 and/or Equation 2 is not satisfied. This reduction and/or minimization of axial and radial displacement of bolt 100 may be achieved without requiring an external securement of the bolt 100 (e.g., without requiring the securing of the bolt with a wrench). The axial displacement of bolt 100 may be determined by the change in position of a desired reference point on the bolt 100 before and after tightening of the nut 300. In the embodiment of FIG. 2, when, for example, it is desirable to have the end 104 of bolt 100 generally flush with the outer surface 203 of housing 200, the axial displacement of interest is the movement of point 110 from its position when nut 300 is un-tightened, to its position when the nut 300 is tightened.

Also shown in FIG. 2 are the normal force components, $F_{NB}$ and $F_{NA}$, that occur during the threaded coupling of nut 300 with bolt 100. $F_{NB}$ is a force normal to a surface of both threads 402a, as shown, and $F_{NA}$ is a force normal to a surface of both threads 400a, as shown. The lengths of force components reflect the magnitude of the force acting normal to the indicated thread surface. When $F_{NB}$ is larger than $F_{NA}$, the axial and rotational movement of bolt 100 relative to housing 200 is minimized and/or reduced during coupling of nut 300 onto bolt 100. As a result of the minimization and/or reduction in axial and rotational movement of bolt 100 relative to housing 200 (in comparison to an otherwise identical threaded installation where Equation 1 and/or Equation 2 is not satisfied), the threaded installation 1000 can be used to accurately position components within a structure. For example, a bearing element, such as a polycrystalline diamond (PCD) bearing element, may be positioned on or at the surface of bolt 100 at the second longitudinal end 104 of bolt 100 (e.g., at or about point 110), such as if housing 200 is a bearing housing. Thus, the bearing element, in such embodiments, may be accurately positioned. That is, the bearing element may be positioned within and relative to housing 200 by threadably coupling bolt 100 with housing 200. Then, the nut 300 may be threadably coupled with bolt 100 to secure (lock) the position of the bolt 100, without resulting in axial and/or rotational displacement of bolt 100 relative to housing 200; therefore, without resulting in axial and/or rotational displacement of the bearing element relative to housing 200. The ability to maintain the axial and/or rotational position of the bearing element is important in applications where, for example, the bearing element has a low clearance, where minor deviations in bearing element position can cause failures in the operation of the particular component. In some embodiments, the bolt 100 has a pocket or cavity formed in the surface of the second longitudinal end 104 of the bolt, and a bearing element, such as a polycrystalline diamond compact (PDC), is positioned within the pocket or cavity. In embodiments wherein the threaded installation is a positioner for a bearing element, the surface of the bearing element is positioned within a system relative to an opposing bearing surface. In some embodiments, the surface of the bolt 100, itself, is the bearing surface. For example, the surface of the bolt 100 at second longitudinal end 104 may be a bearing surface.

Buttress Threaded Connections

Figure 3:
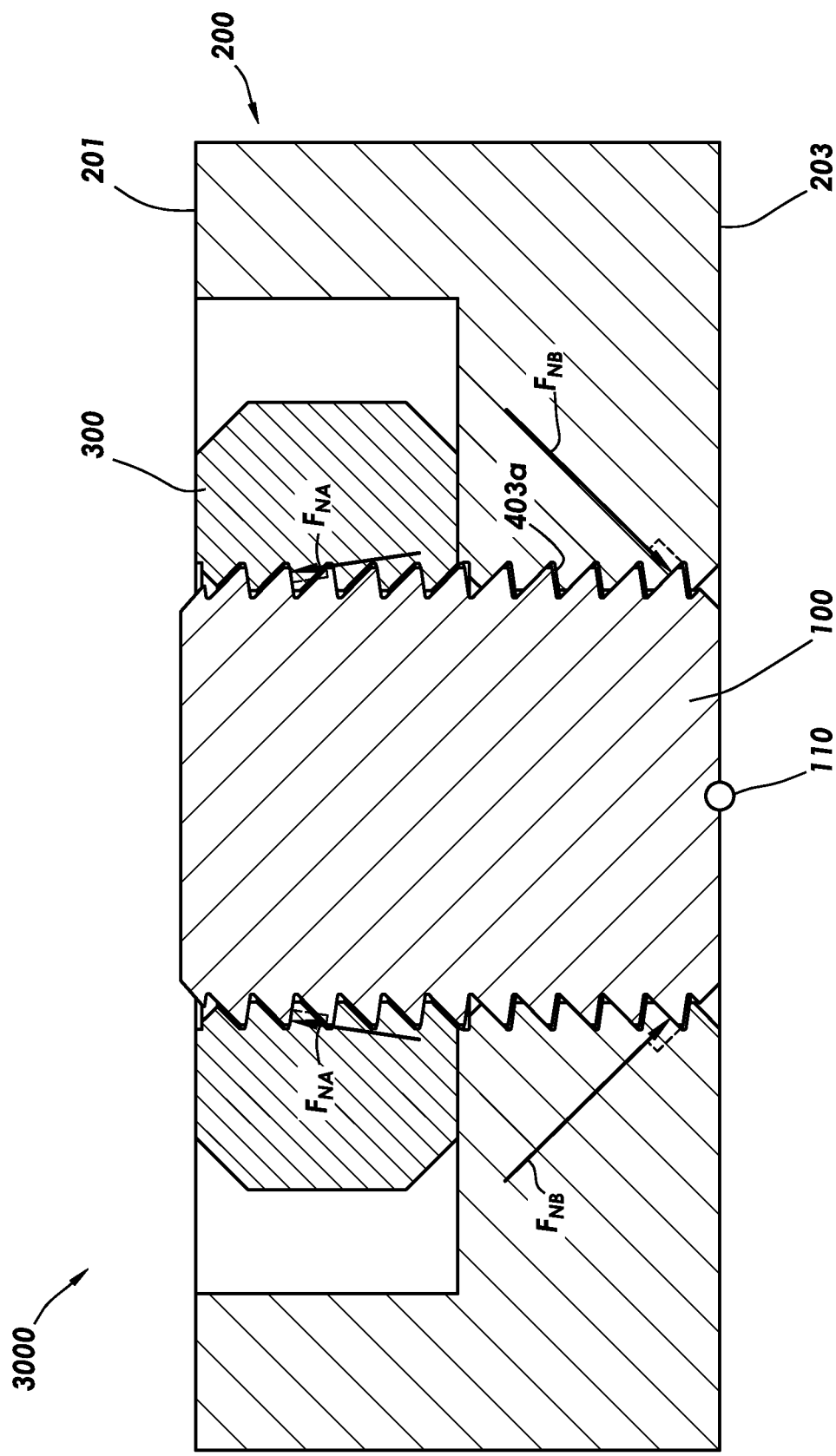
FIG. 3 is a threaded installation having a single, asymmetrical thread form.

FIG. 3 depicts an embodiment of a threaded installation that includes a bolt having a single, asymmetrical thread form. In this particular embodiment, the thread form of the bolt is a buttress thread form that has two different flank angles. In some embodiments, Equation 2 is satisfied with the bolt having a single, asymmetric thread form, such as the buttress thread form. That is, threading the nut to the bolt can be performed with reduced rotational and axial displacement of the bolt, without requiring external securement of the bolt. In some such embodiments, the bolt is of an ANSI American Buttress Thread design (7°/45°). Other flank angle combinations of buttress threads include: 5°/45°, 0°/45°, 2°/55°, and 3°/30°. The bolts disclosed herein are not limited to these particular flank angle combinations, and may include thread forms with other flank angle combinations that satisfy Equation 1 and/or Equation 2. With reference to FIG. 3, threaded installation 3000 includes bolt 100 having buttress threads 403a. For example, buttress threads 403a may be a thread form the same or similar to that shown in FIG. 1B, having a 7° load bearing flank and a 45° non-load bearing flank. Such a buttress thread form, having a $\theta_{2A}=7°$ and $\theta_{3B}=45°$, is in satisfaction of Equations 2. That is:

$$k_2 = \frac{\cos(7°)}{\cos(45°)} \approx 1.4$$

The $k_2$ value of 1.4, above, is greater than 1.00. In some embodiments, a buttress thread form is the preferred thread form for the bolt, at least in part because tooling is readily available to manufacture the buttress thread form. However, the threaded positioning mechanisms disclosed herein are not limited to buttress thread forms, and may have any single or combination of flank angles that meets the established criteria that "k" be equal to or greater than 1.00. Another exemplary combination of flank angles that satisfies Equation 2 is the combination of 2°/55° ($\Theta_{2A}/\Theta_{3B}$).

In threaded installation 3000, the larger flank angle (e.g., 45° flank) is a flank that is not intended or designed to carry load. Whereas, the smaller flank angle (e.g., 7° flank) is a flank that is intended and designed to carry load. As such, the buttress thread form is directional, at least in its as-designed load bearing characteristics. However, Applicants have, found that if the larger flank angle is used to carry the loads on the bolt 100 from bearing load and the smaller flank angle is used carry the loads on bolt 100 from positioning, that turning of the bolt 100 in response to torque during threading of the nut 300 thereto is minimized, and such that displacement of the bolt 100, at point 110, in response to torque during threading of the nut 300 thereto is minimized. In FIG. 3, $F_{NB}$ is a force normal to a surface of the larger flank of threads 403a, as shown, and $F_{NA}$ is a force normal to a surface of the smaller flank of threads 403a, as shown.

Figure 4A:
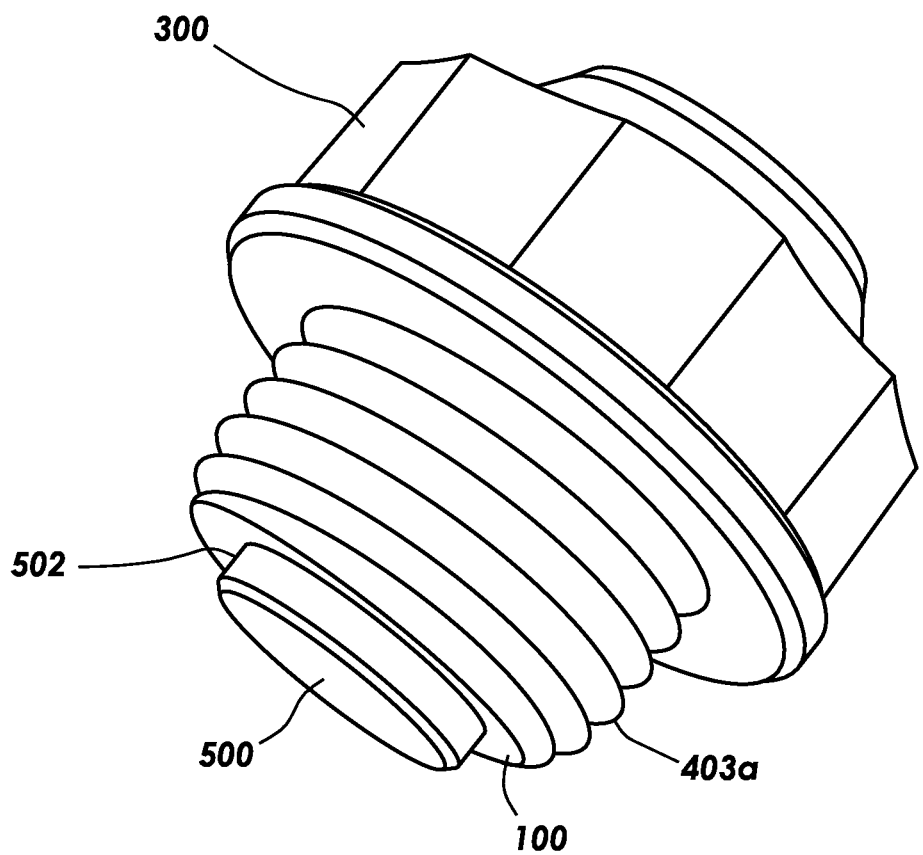
FIG. 4A is a perspective view of a nut threaded to a bolt via a buttress thread, with the bolt having a bearing surface or element.
Figure 4C:
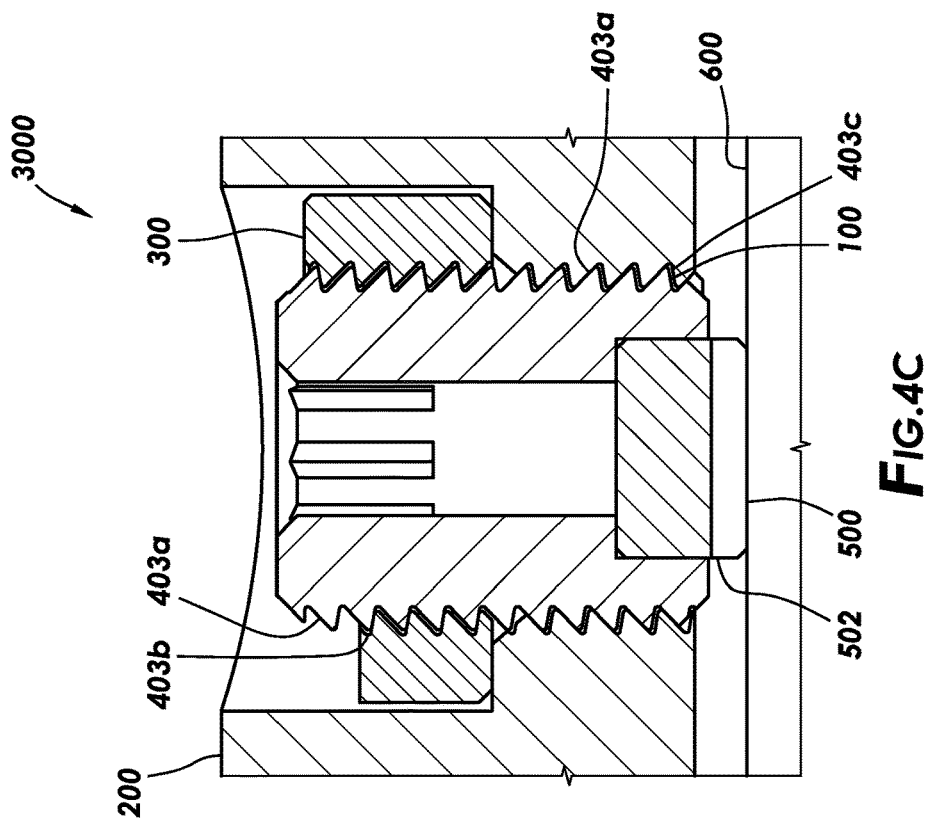
FIG. 4C is a side, cross-sectional view of a nut threaded to a bolt via a buttress thread, with the bolt also threaded to a housing via a buttress thread, and with a bearing surface of the bolt engaged with an opposing bearing surface.
Figure 4B:
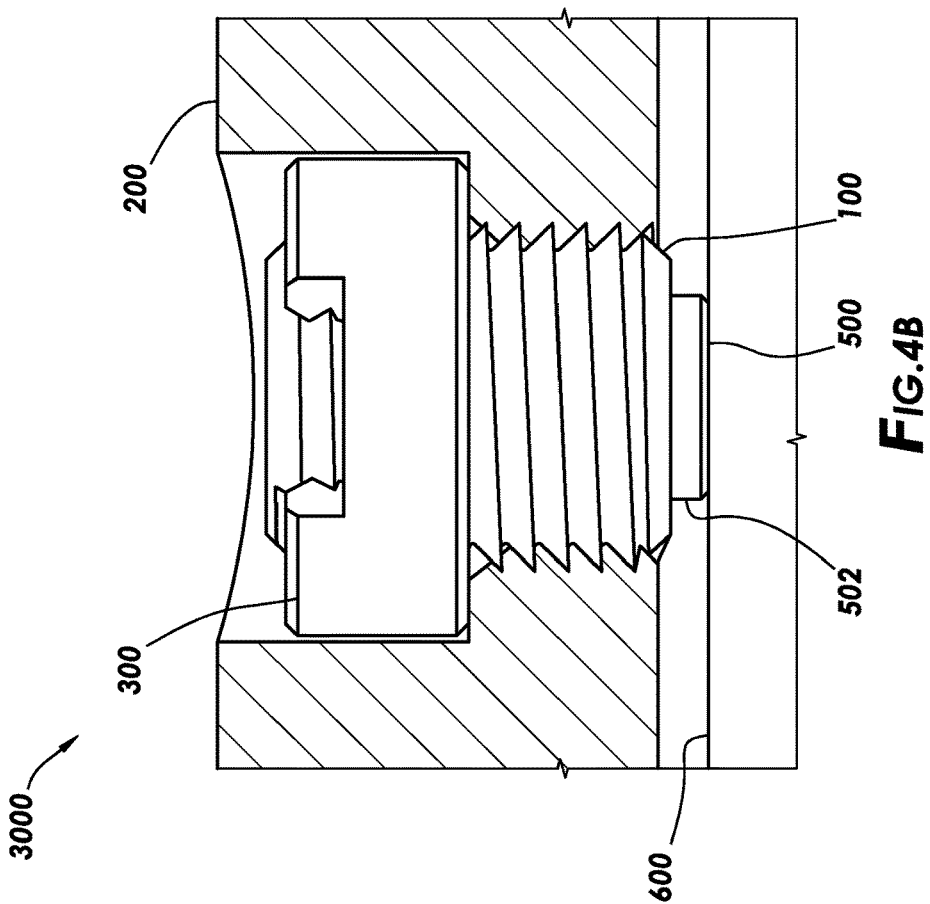
FIG. 4B is a side, cross-sectional view of a nut threaded to a bolt via a buttress thread, with the bolt also threaded to a housing via a buttress thread, and with a bearing surface of the bolt engaged with an opposing bearing surface.

With reference to FIGS. 4A-4C, a nut and bolt combination is shown, which uses a buttress thread form. When using the buttress thread form, while tightening nut 300 to bolt 100, bolt 100 will exhibit reduced turning because the 45° flank of the buttress thread form is loaded, creating larger wedging frictional forces. Because bolt 100 does not turn, axial displacement of bolt 100 is minimized (with the understanding that minor axial displacement of the bolt due to strain created in bolt 100 when tightening nut 300 thereon will still occur). In threaded installation 3000, the torsional friction is less on the interface of the threaded connection between nut 300 and bolt 100 than the torsional friction on the interface of the threaded connection between bolt 100 and housing 200.

As shown in FIGS. 4A-4C, the threaded installations disclosed herein may include a bearing surface 500, and the coupling of the bolt 100, nut 300, and housing 200 may function to position the bearing surface 500 relative to an opposing bearing surface 600. The bearing surface 500 may be a surface of the bolt 100 or the surface of a bearing element 502 that is coupled with the bolt 100, such as the surface of a PDC. For example, FIG. 4C depicts a PDC element 502 coupled within a recess of bolt 100. For example, and without limitation, housing 200 may be a bearing housing or stator, and opposing bearing surface may be the surface of a rotor or other rotating part. Also shown in FIG. 4C are threads 403b of nut 300 mated with threads 403a of bolt 100, and threads 403c of housing 200 mated with threads 403a of bolt 100.

SPIRALOCK® Threaded Connections

Figure 5B:
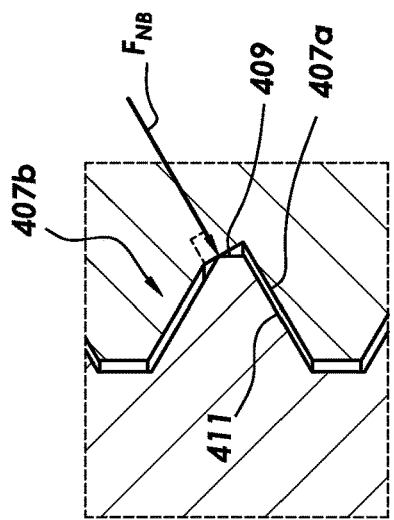
FIG. 5B is a detail view of a threaded connection of FIG. 5A.
Figure 5A:
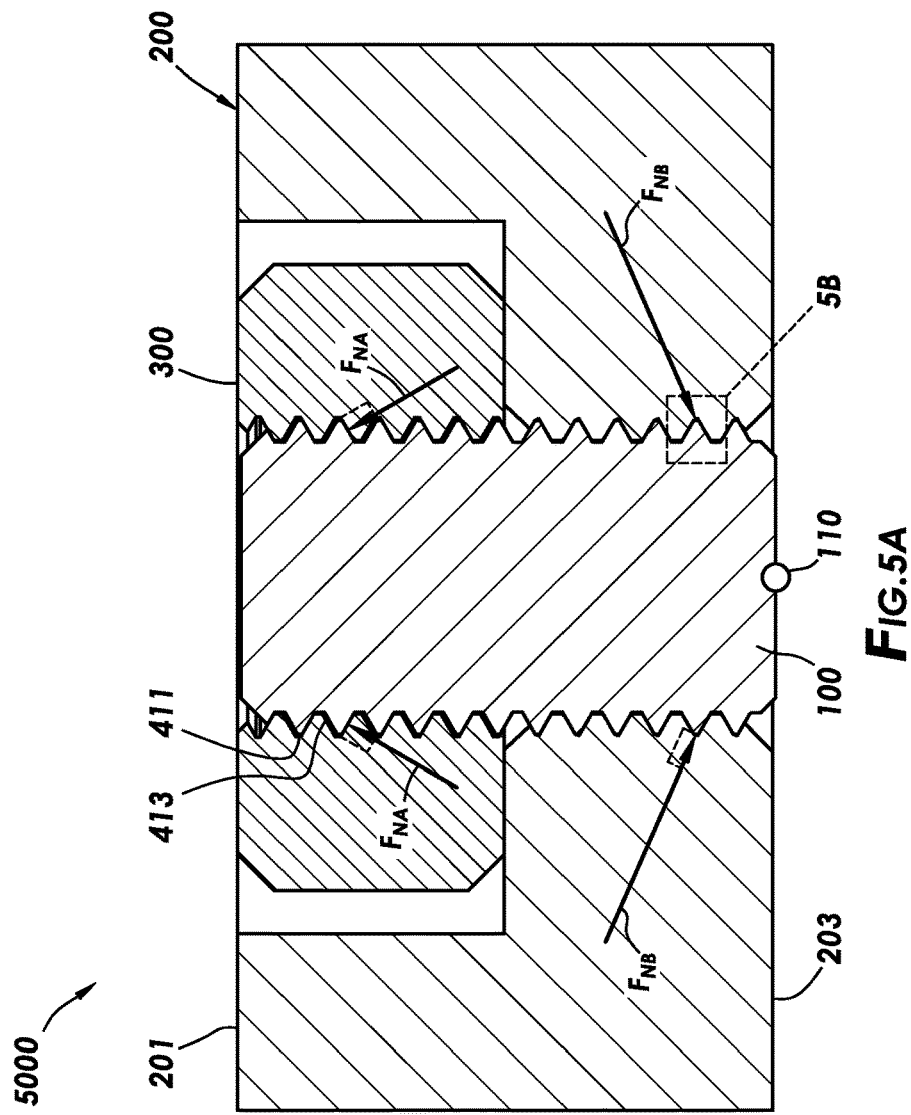
FIG. 5A is a threaded installation having SPIRALOCK® threads.

In some embodiments, SPIRALOCK® threads are used in a threaded installation in accordance with the present disclosure. With reference to FIGS. 5A and 5B, an embodiment of a threaded installation having SPIRALOCK® threads is shown. In the threaded installation 5000 the housing 200 has SPIRALOCK® threading, including a straight flank 407a and a flank 407b having wedge ramp 409 thereon. The symmetric form of the threads of the bolt 100 have the same flank angles. As a result, the forces acting normal to each flank ($F_{NB}$ and $F_{NA}$) is different. While the drawing of FIGS. 5A and 5B may not be to scale, the embodiment depicted has flank angles of 30° and 60°, such that Equation 2 is satisfied (i.e., $k_2=1.73$). Also shown in FIGS. 5A and 5B are threads 411 of bolt 100 mated with threads 403b of nut 300 and with threads 403c or housing 200. In FIGS. 5A and 5B, $F_{NB}$ is a force normal to a surface of the wedge ramp 409 at a coming of the crest of the threads 411, as shown, and $F_{NA}$ is a force normal to a surface of the flanks of threads at the interface of threads 411 and the threads 413 of the nut 300.

Thread Performance

Some attempts to address issues associated with the undesired turning and axial displacement of bolts while threading a nut thereon have included externally securing the bolt (e.g., with a wrench) while tightening the nut. While SPIRALOCK® threads have been used to prevent loosening of bolts due to vibrations when coupled with the appropriate threads, SPIRALOCK® threads have not been used to prevent the undesired turning and axial displacement of bolts while threading a nut thereon. SPIRALOCK® loads the bolt primarily on the crest instead of primarily on the flanks and can plastically deform the bolt if overtightened, causing too much axial displacement of the bolt.

Buttress thread forms are designed to take loads in one direction. When a threaded positioning mechanism in accordance with the present disclosure is used (i.e., in satisfaction of Equation 1 and/or Equation 2), accurate axial positioning of the bolt is provided. Table 1 sets forth three thread types, including standard unified threading, SPIRALOCK® threading, and buttress threading in accordance with the present disclosure, in conjunction with certain performance criteria of the threading.

TABLE 1

THREAD PERFORMANCE

| Thread Type | Bolt does not turn with nut | Bolt axial displacement is minimized |
|---|---|---|
| Standard Unified | x | ✓ |
| SPIRALOCK ® | ✓ | x |
| Buttress Threaded | ✓ | ✓ |

From Table 1, it is evident that when using standard unified threading, the bolt turns in conjunction with the turning of the nut during threading of the nut onto the bolt, but the axial displacement of the bolt is minimized if the bolt can be externally secured. Also, it is evident that, when using SPIRALOCK® threading, the bolt does not turn in conjunction with the turning of the nut during threading of the nut onto the bolt, but the axial displacement of the bolt is not minimized. However, when using a buttress threading that is in satisfaction of Equation 1, the rotation of the bolt is minimized when during threading of the nut onto the bolt, and the axial displacement of the bolt is also minimized. The buttress thread of Table 1 is a buttress thread in which the nut/bolt interface is loaded on the "Loaded Flank" of the buttress thread, and the bolt/housing interface is loaded on the "Unloaded Flank" of the buttress thread. While Table 1 shows a standard unified thread form and a SPIRALOCK® thread form that do not provide the benefits of minimizing rotational and axial displacement of the bolt during threading of the nut thereon, the present disclosure includes bolts of both standard unified thread form and SPIRALOCK® thread form that do provide these benefits, as long as one or both of Equations 1 and 2 are satisfied.

Examples

The following examples show particular embodiments of the disclosure. It is understood that the examples are given by way of illustration and are not intended to limit the specification or the claims.

Figure 6:
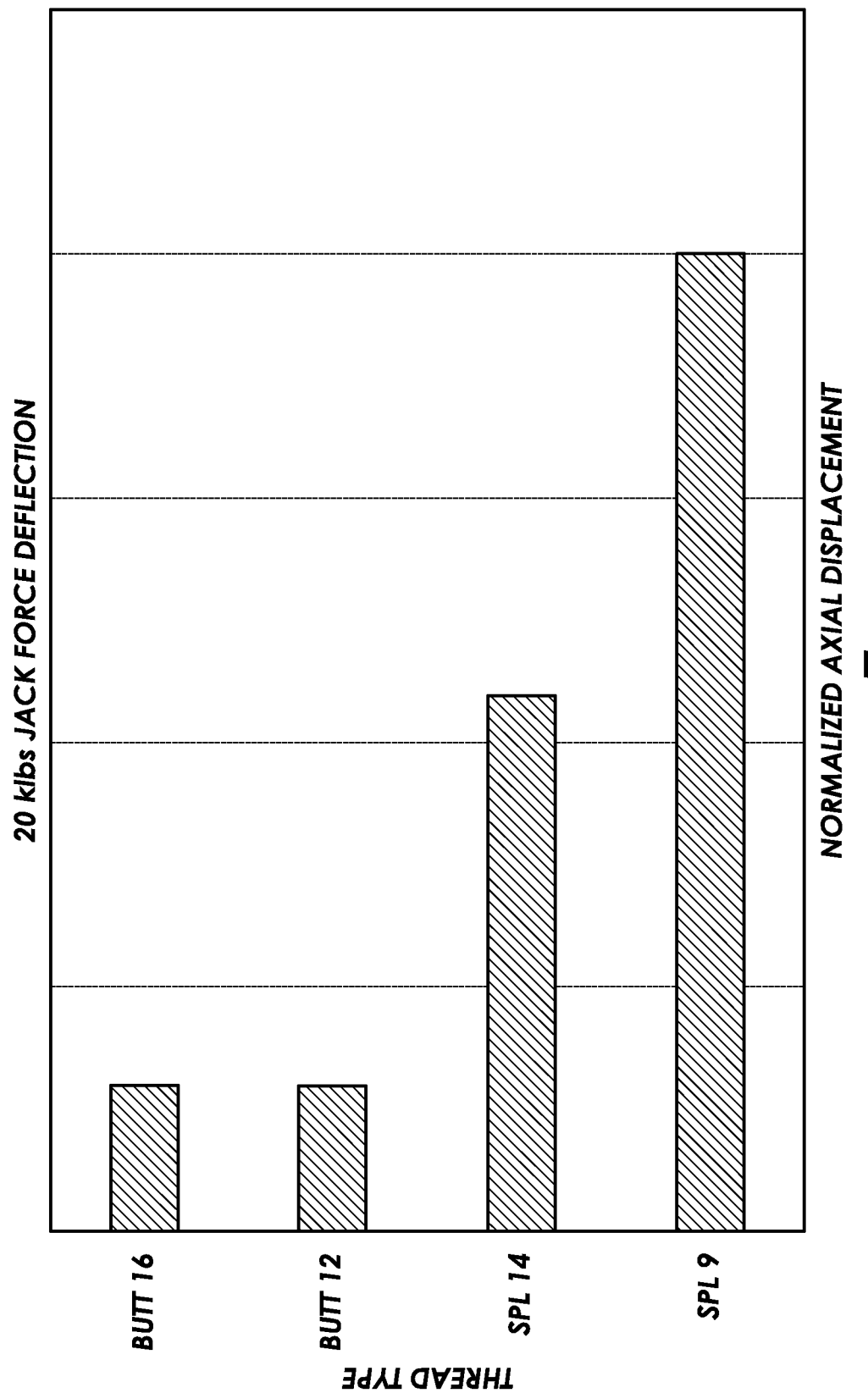
FIG. 6 is a bar graph of normalized axial displacement for multiple buttress threads and SPIRALOCK® threads.

To assess the axial displacement that occurs on different thread types, four different thread types were analyzed in a computer simulation of 3D CAD models, under load. The thread types included a buttress thread having 16 threads per inch (BUTT 16, in FIG. 6), a buttress thread having 12 threads per inch (BUTT 12, in FIG. 6), a SPIRALOCK® thread having 14 threads per inch (SPL 14, in FIG. 6), and a SPIRALOCK® thread having 9 threads per inch (SPL 9, in FIG. 6). Both BUTT 16 and BUTT 12 satisfy Equation 2. In SPL9 and SPL 14, the angle of the wedge ramp on the housing thread (instead of the symmetric flank angle on the bolt) is such that the bolt does not turn when the nut is tightened. With reference to FIG. 4, at 20 klbs jack force, the normalized axial displacement of the four different thread types are plotted, as determined in the computer simulation on the 3D CAD models. As is evident from FIG. 6, the normalized axial displacement for the bolts was less for both of the buttress threads (BUTT 16 and BUTT 12), in comparison to the normalized axial displacement for both of the SPIRALOCK® threads (SPL 14 and SPL 9). Thus, the buttress threading in accordance with the present disclosure provides for a reduction in normalized axial displacement under load conditions, in comparison to the normalized axial displacement of SPIRALOCK® threads. Without being bound by theory, the SPIRALOCK® threaded bolt substantially moves because of the deflection of the thread flank when loaded, or strain in the bolt. The results of FIG. 6 are of computer simulation, and were subsequently validated in a lab on prototype parts of the four different threaded types.

Applications

The threaded positioning mechanisms disclosed herein may be used with various components (tools, machines, equipment, apparatus, systems) that have threaded connections. Some exemplary components include load-bearing machine components, including bearings, such as cam followers, radial bearings, thrust bearings, and combined bearings, including bearings for use in downhole applications; oil and gas drilling components; and other downhole drilling components. From the descriptions and figures provided above it can readily be understood that the threaded positioning mechanisms of the present application may be employed in a broad spectrum of applications, including those in downhole environments. The technology provided herein additionally has broad application to other industrial applications. The threaded installations disclosed herein may be used to position components within fixtures for manufacturing. The threaded installations disclosed herein may be used as linear guides or limit switches. The threaded installations disclosed herein may be used to position bearing elements (e.g., PDCs), such as in downhole drilling tools or other load-bearing surfaces. For example, the threaded installations disclosed herein may be used to position the polycrystalline diamond bearing elements: within the cam follower body disclose in U.S. Pat. No. 10,465,775; as a radial bearing within a stator or rotor as disclosed in United States Patent Publication No. 2020/0032841; as a thrust bearing within the thrust face as disclosed in United States Patent Publication No. 2020/0032846; as a support element within the cup of the roller ball assembly as disclosed in United States Patent Publication No. 2020/0031586; within the tubulars as disclosed in United States Patent Publication No. 2020/0063503; within any of the bearing structures disclosed in United States Patent Publication No. 2020/0056659; and/or within the downhole drilling tool as disclosed in United States Patent Publication No. 2020/0063498. The threaded installations disclosed herein may be used to position bearing elements (e.g., PDCs) within gear teeth, components of drivelines (e.g., universal joints), or other power transmission surfaces. The threaded installations disclosed herein may be used to position bearing elements within tilting pad bearings. The threaded installations disclosed herein may be used to position guides in equipment. The threaded installations disclosed herein may be used as fasteners to attach a stabilizer to a drill string, such as is described in U.S. Pat. No. 4,275,935.

Embodiments

Various embodiments of the present disclosure will now be set forth.

Embodiment 1

A threaded installation, the threaded installation comprising: a nut, a bolt, and a housing, the housing including a threaded hole; a first threaded connection, wherein the bolt is threadably coupled with the nut; and a second threaded connection, wherein the bolt is threadably coupled with the threaded hole; wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 2

The threaded installation of embodiment 1, wherein the bolt is threadably coupled with the nut and the housing via asymmetrical threads.

Embodiment 3

The threaded installation of embodiment 2, wherein the nut and the housing each comprise a locking thread form that includes threads having a wedge ramp at a root of the threads, or wherein the bolt comprises a locking thread form that includes threads having a wedge ramp at a root of the threads.

Embodiment 4

The threaded installation of embodiment 2, wherein the bolt is threadably coupled with the nut at the first threaded connection via buttress threads, and wherein the bolt is threadably coupled with the housing at the second threaded connection via buttress threads.

Embodiment 5

The threaded installation of embodiment 4, wherein the buttress threads include a load bearing flank and a non-load bearing flank, and wherein the first threaded connection is loaded on the load bearing flanks and the second threaded connection is loaded on the non-load bearing flanks.

Embodiment 6

The threaded installation of embodiment 1, wherein the first threaded connection includes a first thread form on the bolt and the nut, wherein the second threaded connection includes a second thread form on the bolt and the housing, and wherein the first thread form and the second thread form are different thread forms.

Embodiment 7

The threaded installation of embodiment 6, wherein both the first and second thread forms are symmetrical threads.

Embodiment 8

The threaded installation of embodiment 7, wherein the first threaded connection is characterized by a first thread angle, $\Theta_{1A}$, of threads of the bolt; wherein the second threaded connection is characterized by a second thread angle, $\Theta1_A$, of threads of the bolt; and wherein $\Theta_{1A}$ and $\Theta_{1B}$ satisfy the following equation:

$$k_1 = \frac{\cos(\theta_{1A}/2)}{\cos(\theta_{1B}/2)} > 1.00.$$

Embodiment 9

The threaded installation of any of embodiments 1 to 8, wherein $k_2$ ranges from 1.05 to 11.

Embodiment 10

The threaded installation of any of embodiments 1 to 9, wherein $\Theta_{2A}$ ranges from 0° to 30°, and wherein $\Theta_{3B}$ ranges from 30° to 80°.

Embodiment 11

The threaded installation of any of embodiments 1 to 10, wherein a ratio of torsional friction of the second thread connection to torsional friction of the first threaded connection is greater than 1.

Embodiment 12

The threaded installation of any of embodiments 1 to 11, wherein the bolt comprises a bearing surface.

Embodiment 13

The threaded installation of any of embodiments 1 to 11, further comprising a bearing element coupled with the bolt, the bearing element having a bearing surface.

Embodiment 14

The threaded installation of any of embodiments 1 to 13, wherein the housing is a bearing housing.

Embodiment 15

A system comprising: a housing, the housing comprising a threaded hole; a nut; a bolt, the bolt having an engagement surface thereon or coupled therewith; a first threaded connection, wherein the bolt is threadably coupled with the nut, and a second threaded connection, wherein the bolt is threadably coupled with the threaded hole; and an opposing housing having an opposing engagement surface, wherein the opposing housing is positioned relative to the bolt such that the engagement surface engages with or is spaced-apart from the opposing engagement surface; wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 16

The system of embodiment 15, wherein the system is a bearing assembly, and wherein the engagement surface is a bearing engagement surface and the opposing engagement surface is an opposing bearing engagement surface.

Embodiment 17

A method of maintaining a position of a bolt within a threaded installation, the method comprising: threadably coupling a bolt with a threaded hole of a housing; threadably coupling a nut with the bolt, forming a threaded installation; wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 18

The method of embodiment 17, wherein, during threading of the nut onto the bolt, rotational and axial displacement of the bolt, relative to the housing, is reduced relative to a theoretical rotational and axial displacement of a bolt in an otherwise identical threaded installation where $\Theta_{2A}$ and $\Theta_{3B}$ do not satisfy the following equation:

$$k_2 = \frac{\cos(\theta_{2A})}{\cos(\theta_{3B})} > 1.00.$$

Embodiment 19

The method of any of embodiments 17 to 18, wherein, during threading of the nut onto the bolt, torsional friction is less at the threaded connection between the nut and the bolt than torsional friction at the threaded connection between the bolt and the housing.

Embodiment 20

The method of any of embodiments 17 to 19, wherein the threaded connections between the bolt and the nut and between the bolt and the housing have the same asymmetrical thread form.

Embodiment 21

The method of any of embodiments 17 to 19, wherein the threaded connections between the bolt and the nut and between the bolt and the housing have the different thread forms.

Embodiment 22

The method of any of embodiments 17 to 19, wherein the housing comprises a locking thread form that includes threads having a wedge ramp at a root of the threads.

Embodiment 23

The method of any of embodiments 17 to 19, wherein the bolt is threadably coupled with the nut and with the housing via buttress threads.

Embodiment 24

The method of embodiment 23, wherein the buttress threads include a load bearing flank and a non-load bearing flank, wherein the threaded connection between the bolt and the nut is loaded on the load bearing flanks, and wherein the threaded connection between the bolt and the housing is loaded on the non-load bearing flanks.

Embodiment 25

The method of any of embodiments 17 to 24, wherein the bolt has a bearing engagement surface thereon or coupled therewith, the method comprising positioning the bearing engagement surface relative to an opposing bearing engagement surface.

Embodiment 26

A threaded installation, the threaded installation comprising: a nut, a bolt, and a housing, the housing including a threaded hole; a first threaded connection, wherein the bolt is threadably coupled with the nut; and a second threaded connection, wherein the bolt is threadably coupled with the threaded hole; wherein the bolt has asymmetric threading, including a first flank having a first flank angle and a second flank having a second flank angle, wherein the first flank angle is smaller than the second flank angle, and wherein the second flank carries bearing load on the bolt, and wherein the first flank carries positioning load on the bolt.

Embodiment 27

The threaded installation of embodiment 26, wherein the asymmetric threading of the bolt is buttress threading.

Embodiment 28

The threaded installation of any of embodiments 26 and 27, wherein the first threaded connection is characterized by the first flank angle, $\Theta_{2A}$, of threads of the bolt or threads of the nut, wherein the second threaded connection is characterized by the second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 29

The threaded installation of embodiment 28, wherein $k_2$ ranges from 1.05 to 11.

Embodiment 30

The threaded installation of embodiment 28, wherein $\Theta_{2A}$ ranges from 0° to 30°, and wherein $\Theta_{3B}$ ranges from 30° to 80°.

Embodiment 31

The threaded installation of any of embodiments 26 to 30, wherein a ratio of torsional friction of the second thread connection to torsional friction of the first threaded connection is greater than 1.

Embodiment 32

The threaded installation of any of embodiments 26 to 31, wherein the bolt comprises a bearing surface.

Embodiment 33

The threaded installation of any of embodiments 26 to 31, further comprising a bearing element coupled with the bolt, the bearing element having a bearing surface.

Embodiment 34

The threaded installation of any of embodiments 26 to 33, wherein the housing is a bearing housing.

Embodiment 35

A system comprising: a housing, the housing comprising a threaded hole; a nut; a bolt, the bolt having an engagement surface thereon or coupled therewith; a first threaded connection, wherein the bolt is threadably coupled with the nut, and a second threaded connection, wherein the bolt is threadably coupled with the threaded hole; and an opposing housing having an opposing engagement surface, wherein the opposing housing is positioned relative to the bolt such that the engagement surface engages with or is spaced-apart from the opposing engagement surface; wherein the bolt has asymmetric threading, including a first flank having a first flank angle and a second flank having a second flank angle, wherein the first flank angle is smaller than the second flank angle, and wherein the second flank carries bearing load on the bolt, and wherein the first flank carries positioning load on the bolt.

Embodiment 36

The system of embodiment 35, wherein the first threaded connection is characterized by the first flank angle, $\Theta_{2A}$, of threads of the bolt or threads of the nut, wherein the second threaded connection is characterized by the second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 37

The system of any of embodiments 35 and 36, wherein the system is a bearing assembly, and wherein the engagement surface is a bearing engagement surface and the opposing engagement surface is an opposing bearing engagement surface.

Embodiment 38

A method of maintaining a position of a bolt within a threaded installation, the method comprising: threadably coupling a bolt with a threaded hole of a housing; threadably coupling a nut with the bolt, forming a threaded installation; wherein the bolt has asymmetric threading, including a first flank having a first flank angle and a second flank having a second flank angle, and wherein the first flank angle is smaller than the second flank angle; and carrying bearing load on the bolt on the second flank, and carrying positioning load on the bolt on the first flank.

Embodiment 39

The method of embodiment 38, wherein threaded connection between the nut and the bolt is characterized by the first flank angle, $\Theta_{2A}$, of threads of the bolt or threads of the nut, wherein threaded connection between the bolt and the housing is characterized by the second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00.$$

Embodiment 40

The method of embodiment 39, wherein, during threading of the nut onto the bolt, rotational and axial displacement of the bolt, relative to the housing, is reduced relative to a theoretical rotational and axial displacement of a bolt in an otherwise identical threaded installation where $\Theta_{2A}$ and $\Theta_{3B}$ do not satisfy the following equation:

$$k_2 = \frac{\cos(\theta_{2a})}{\cos(\theta_{3B})} > 1.00.$$

Embodiment 41

The method of embodiment 38, wherein, during threading of the nut onto the bolt, torsional friction is less at the threaded connection between the nut and the bolt than torsional friction at the threaded connection between the bolt and the housing.

Embodiment 42

The method of embodiment 38, wherein the threaded connections between the bolt and the nut and between the bolt and the housing have the same asymmetrical thread form.

Embodiment 43

The method of embodiment 38, wherein the threaded connections between the bolt and the nut and between the bolt and the housing have the different thread forms.

Embodiment 44

The method of embodiment 38, wherein the bolt is threadably coupled with the nut and with the housing via buttress threads.

Embodiment 45

The method of embodiment 38, wherein the bolt has a bearing engagement surface thereon or coupled therewith, the method comprising positioning the bearing engagement surface relative to an opposing bearing engagement surface.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A threaded installation, the threaded installation comprising:
a nut, a bolt, and a housing, the housing including a threaded hole;
a first threaded connection, wherein the bolt is threadably coupled with the nut; and
a second threaded connection, wherein the bolt is threadably coupled with the threaded hole;
wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the bolt is threadably coupled with the nut and the housing via asymmetrical threads on the nut, asymmetrical threads on the bolt, and asymmetrical threads on the threaded hole, wherein the first threaded connection includes the asymmetrical threads of the bolt threadably coupled with the asymmetrical threads of the nut; and wherein the second threaded connection includes the asymmetrical threads of the bolt threadably coupled with the asymmetrical threads of the threaded hole.

2. The threaded installation of claim 1, wherein the bolt is threadably coupled with the nut at the first threaded connection via buttress threads on the nut and buttress threads on the bolt, and wherein the bolt is threadably coupled with the housing at the second threaded connection via buttress threads on the threaded hole and buttress threads on the bolt.

3. The threaded installation of claim 2, wherein the buttress threads on the bolt include a load bearing flank and a non-load bearing flank, and wherein the first threaded connection is loaded on the load bearing flanks and the second threaded connection is loaded on the non-load bearing flanks.

4. The threaded installation of claim 1, wherein $k_2$ ranges from 1.05 to 11.

5. The threaded installation of claim 1, wherein $\Theta_{2A}$ ranges from 0° to 30°, and wherein $\Theta_{3B}$ ranges from 30° to 80°.

6. The threaded installation of claim 1, wherein the bolt comprises a bearing surface.

7. The threaded installation of claim 1, further comprising a bearing element coupled with the bolt, the bearing element having a bearing surface.

8. The threaded installation of claim 1, wherein the housing is a bearing housing.

9. The threaded installation of claim 1, wherein the first threaded connection is characterized by a first flank angle, $\Theta_{2A}$, of threads of the bolt, wherein the second threaded connection is characterized by a second flank angle, $\Theta_{3B}$, of threads of the bolt, and wherein $\Theta_{2A}$ and $\Theta_{3B}$ satisfy the following equation:

$$k_2 = \frac{\cos(\theta_{2A})}{\cos(\theta_{3B})} > 1.00.$$

10. A threaded installation, the threaded installation comprising:
a nut, a bolt, and a housing, the housing including a threaded hole;
a first threaded connection, wherein the bolt is threadably coupled with the nut; and
a second threaded connection, wherein the bolt is threadably coupled with the threaded hole;
wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the bolt is threadably coupled with the nut and the housing via asymmetrical threads, and wherein the housing comprises a locking thread form that includes threads having a wedge ramp at a root of the threads.

11. A threaded installation, the threaded installation comprising:
a nut, a bolt, and a housing, the housing including a threaded hole;
a first threaded connection, wherein the bolt is threadably coupled with the nut; and
a second threaded connection, wherein the bolt is threadably coupled with the threaded hole;
wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the first threaded connection includes a first thread form on the bolt and the nut, wherein the second threaded connection includes a second thread form on the bolt and the housing, and wherein the first thread form and the second thread form are different thread forms.

12. The threaded installation of claim 11, wherein both the first and second thread forms are symmetrical threads.

13. The threaded installation of claim 12, wherein the first threaded connection is characterized by a first thread angle, $\Theta_{1A}$, of threads of the bolt; wherein the second threaded connection is characterized by a second thread angle, $\Theta_{1B}$, of threads of the bolt; and wherein $\Theta_{1A}$ and $\Theta_{1B}$ satisfy the following equation:

$$k_1 = \frac{\cos(\theta_{1A}/2)}{\cos(\theta_{1B}/2)} > 1.00.$$

14. A threaded installation, the threaded installation comprising:
a nut, a bolt, and a housing, the housing including a threaded hole;

a first threaded connection, wherein the bolt is threadably coupled with the nut; and
a second threaded connection, wherein the bolt is threadably coupled with the threaded hole;
wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein a ratio of torsional friction of the second thread connection to torsional friction of the first threaded connection is greater than 1.

15. A threaded installation, the threaded installation comprising:
a nut, a bolt, and a housing, the housing including a threaded hole;
a first threaded connection, wherein the bolt is threadably coupled with the nut; and
a second threaded connection, wherein the bolt is threadably coupled with the threaded hole;
wherein the first threaded connection is characterized by a first flank angle, $\Theta_{2A}$, of threads of the bolt or threads of the nut, wherein the second threaded connection is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the bolt has an engagement surface thereon or coupled therewith;
an opposing housing having an opposing engagement surface, wherein the opposing housing is positioned relative to the bolt such that the engagement surface engages with or is spaced-apart from the opposing engagement surface.

16. The threaded installation of claim 15, wherein the engagement surface is a bearing engagement surface and the opposing engagement surface is an opposing bearing engagement surface.

17. The threaded installation of claim 16, wherein the housing is a stator and the opposing housing is a rotor, and wherein the bearing engagement surface is a surface of a polycrystalline diamond bearing element that is coupled with the bolt.

18. A method of maintaining a position of a bolt within a threaded installation, the method comprising:
threadably coupling a bolt with a threaded hole of a housing;
threadably coupling a nut with the bolt, forming a threaded installation;
wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the bolt is threadably coupled with the nut via asymmetrical threads on the bolt and asymmetrical threads on the nut, wherein the bolt is threadably coupled with the housing via asymmetrical threads on the bolt and asymmetrical threads on the threaded hole, and wherein the threaded connections between the bolt and the nut and between the bolt and the housing have the same asymmetrical thread form.

19. The method of claim 18, wherein the bolt has a bearing engagement surface thereon or coupled therewith, the method comprising positioning the bearing engagement surface relative to an opposing bearing engagement surface.

20. A method of maintaining a position of a bolt within a threaded installation, the method comprising:
threadably coupling a bolt with a threaded hole of a housing;
threadably coupling a nut with the bolt, forming a threaded installation;
wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein, during threading of the nut onto the bolt, torsional friction is less at the threaded connection between the nut and the bolt than torsional friction at the threaded connection between the bolt and the housing.

21. A method of maintaining a position of a bolt within a threaded installation, the method comprising:
threadably coupling a bolt with a threaded hole of a housing;
threadably coupling a nut with the bolt, forming a threaded installation;
wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the threaded connection between the bolt and the nut has a first thread form, wherein the threaded connection between the bolt and the housing has a second thread form, and wherein the first and second thread forms are different thread forms.

22. A method of maintaining a position of a bolt within a threaded installation, the method comprising:
threadably coupling a bolt with a threaded hole of a housing;

threadably coupling a nut with the bolt, forming a threaded installation;
wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the housing comprises a locking thread form that includes threads having a wedge ramp at a root of the threads.

23. A method of maintaining a position of a bolt within a threaded installation, the method comprising:
threadably coupling a bolt with a threaded hole of a housing;
threadably coupling a nut with the bolt, forming a threaded installation;
wherein threaded connection between the nut and the bolt is characterized by a first flank angle, $\Theta_{2A}$, of threads of the bolt or threads of the nut, wherein threaded connection between the bolt and the housing is characterized by a second flank angle, $\Theta_{3B}$, of threads of the bolt or threads of the housing, and wherein $\Theta_{2A}$ and $\Theta_{3B}$ satisfy the following equation:

$$k_2 = \frac{\cos(\theta_{2A})}{\cos(\theta_{3B})} > 1.00$$

wherein the bolt is threadably coupled with the nut and with the housing via buttress threads on the bolt, buttress threads on the nut, and buttress threads on the threaded hole of the housing.

24. The method of claim 23, wherein the buttress threads on the bolt include a load bearing flank and a non-load bearing flank, wherein the threaded connection between the bolt and the nut is loaded on the load bearing flanks, and wherein the threaded connection between the bolt and the housing is loaded on the non-load bearing flanks.

25. A threaded installation, the threaded installation comprising:
a nut having asymmetrical threads, a bolt have asymmetrical threads, and a housing, the housing including a threaded hole having asymmetrical threads;
a first threaded connection, wherein the asymmetrical threads of the bolt are threadably coupled with the asymmetrical threads of the nut; and
a second threaded connection, wherein the asymmetrical threads of the bolt are threadably coupled with the asymmetrical threads of the threaded hole;
wherein the asymmetrical threads of the bolt include a first flank having a first flank angle and a second flank having a second flank angle, wherein the first flank angle is smaller than the second flank angle, and wherein the second flank carries bearing load on the bolt, and wherein the first flank carries positioning load on the bolt.

26. A threaded installation, the threaded installation comprising:
a nut, a bolt, and a housing, the housing including a threaded hole;
a first threaded connection, wherein the bolt is threadably coupled with the nut; and
a second threaded connection, wherein the bolt is threadably coupled with the threaded hole;
wherein the bolt has asymmetrical threading, including a first flank having a first flank angle and a second flank having a second flank angle, wherein the first flank angle is smaller than the second flank angle, and wherein the second flank carries bearing load on the bolt, and wherein the first flank carries positioning load on the bolt;
wherein the bolt has an engagement surface thereon or coupled therewith;
an opposing housing having an opposing engagement surface, wherein the opposing housing is positioned relative to the bolt such that the engagement surface engages with or is spaced-apart from the opposing engagement surface.

27. A method of maintaining a position of a bolt within a threaded installation, the method comprising:
threadably coupling a bolt with a threaded hole of a housing by threadably engaging asymmetrical threads of the bolt with asymmetrical threads of the threaded hole;
threadably coupling a nut with the bolt by threadably engaging asymmetrical threads of the bolt with asymmetrical threads of the nut, forming a threaded installation;
wherein the asymmetrical threads of the bolt include a first flank having a first flank angle and a second flank having a second flank angle, and wherein the first flank angle is smaller than the second flank angle; and
carrying bearing load on the bolt on the second flank, and carrying positioning load on the bolt on the first flank.

* * * * *